Figure 1:
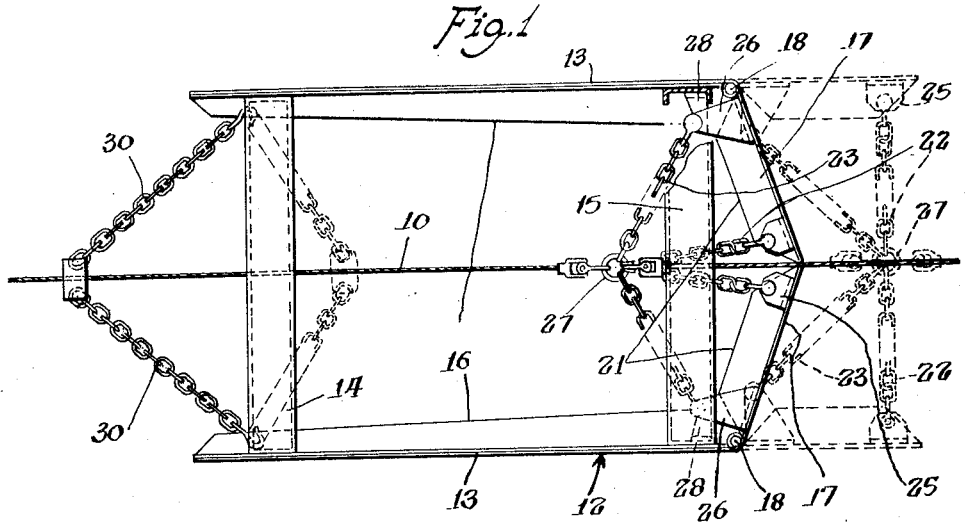

Feb. 19, 1929.  A. B. ESSELTINE  1,702,562

OPEN END SCRAPER

Original Filed Dec. 24, 1924

Witness
Herbert A. Buehler

Inventor
Alfred B. Esseltine
Clarence T. Poole
Attorney

Patented Feb. 19, 1929.

1,702,562

UNITED STATES PATENT OFFICE.

ALFRED B. ESSELTINE, OF CHICAGO, ILLINOIS, ASSIGNOR TO GOODMAN MANUFACTURING COMPANY, OF CHICAGO, ILLINOIS, A CORPORATION OF ILLINOIS.

OPEN-END SCRAPER.

Application filed December 24, 1924, Serial No. 757,868. Renewed January 26, 1927.

This invention relates to improvements in scrapers used for transporting loose material, and more particularly to reciprocably operated scrapers having a pair of laterally opening rear wall portions operatively connected with draft means extending in opposite directions and operating to open the wall portions when the scraper is moved rearwardly for loading the same and closing the wall portions when the scraper is moved forwardly.

Figure 2:
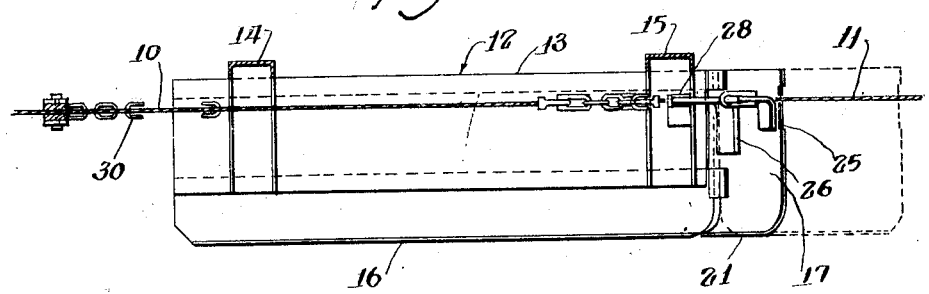

The object of the present invention is to provide an improved construction of a scraper of the class described as will hereinafter more fully appear in the drawings, in which:

Figure 1 is a top plan view of a scraper constructed in accordance with my invention; and Figure 2 is a vertical cross section of the scraper shown in Figure 1.

The scraper shown in the drawings is provided with flexible draft ropes comprising a head rope 10 and a tail rope 11, for moving the scraper forwardly and rearwardly respectively. The scraper apparatus is set up in any suitable manner, with the draft ropes trained over fixed guides or sheaves and operatively connected with any suitable power device such as a hoisting engine.

The scraper comprises a body portion 12 having side walls 13, 13, connected by front and rear cross members 14 and 15 respectively. The drawings illustrate a preferred form of the scraper having no bottom, but a bottom may be desirable under some circumtances and may be provided without departing from the scope of my invention. The bottom margins of the side walls 13, 13, are preferably inclined or turned inwardly to form substantially horizontal cutting edges 16, 16, as shown.

The rear end of the scraper comprises two upright wall portions 17, 17, each pivotally connected to the rear end of a side wall as indicated at 18, 18. The arrangement is such that the pivoted wall portions normally form a closure for the rear end of the scraper, but each wall portion is mounted to swing laterally and rearwardly into substantial alignment with its adjacent side wall 13. The bottom margin of the rear wall portions 17, 17, is preferably inclined or turned inwardly to form cutting edges 21, 21, similar to the cutting edges 16, 16, on the side walls.

Referring now to the novel features of the present invention, it will be observed that each of the wall portions 17, 17, are connected at a common point of connection with the head rope 10 and the tail rope 11, by means of a pair of flexible connections such as the chains 22 and 23. The chains 22 are connected to a flanged member 25 adjacent the extreme end of each of the wall portions 17. The other chain 23 is connected to an inwardly extending projection 26 connected adjacent the pivoted end of each of the wall portions 17. The meeting ends of the chains 22 and 23, as herein shown, are connected to a ring 27 which in turn is suitably connected to the head rope 10 and the tail rope 11 extending in opposite directions therefrom. The arrangement is such that the flexible chains 22 and 23 cooperate with the head and tail ropes to open and close the pivoted wall portions 17, 17, depending upon the relative draft of the head rope and tail rope. Thus when the tail rope is pulled rearwardly the wall portions 17, 17, will be opened as indicated in dotted lines in the drawings. When draft is released on the tail rope and the head rope is pulled the wall portions will be swung into the closed position, as shown in full lines in the drawings. The arrangement of the connecting chains 22 and 23 is such as to provide a maximum efficiency in the operation of the opening portions and maintain them in parallel relationship when the rear ends of these doors are digging into the material during the loading operation. For this purpose, the rearmost pair of connecting chains 22, 22, are of such length as to limit the opening movement of the doors 17 when the chains are in alignment with each other, as shown in dotted lines in Figure 1. In this position it will be observed that the other chains 23, 23, are arranged at an intermediate angle with the tail rope 11 and being connected to the projecting arms 26, 26, afford a considerable leverage to maintain the doors in open parallel position during the digging operation. When the movement of the scraper is reversed by pulling the head rope 10 a maximum draft is then transferred to the chains 22, 22, so as to close the members 17 quickly. When the doors are in fully closed position, the chains assume the position shown in the full lines in the drawings, with the line of draft exerted upon the two chains 22, 22, almost in a direct line with the head rope 10. Any suitable stops may be provided for limiting the inward movement of the doors as for instance the arm 26 may engage a stop 28 connected to the side walls 13 adjacent the pivotal connections 18, 18. The front end of the scraper is connected also to the head rope 10 by any suitable means such as chains 30, 30, as shown.

Although I have shown and described one embodiment of my invention, it will be understood that the arrangement and construction of the various parts may be altered without departing from the spirit and scope of the invention. Furthermore, I do not wish to be construed as limiting myself to the particular construction illustrated excepting as may be specifically limited in the appended claims.

I claim as my invention:

1. A scraper comprising a body portion and a pair of pivoted laterally swinging rear end portions, draft means for reciprocably moving said scraper comprising a head rope and a tail rope adapted to extend in opposite directions, and means connecting the head and tail rope with each of said pivoted rear end portions comprising two pairs of members each connected adjacent the opposite ends of said pivoted rear end portions, the outermost pair of said connecting members being of sufficient length to limit the outward movement of the pivoted portions in substantially parallel relation when said members are substantially in alignment with each other.

2. A scraper comprising a body portion and a pair of pivoted laterally swinging rear end portions, draft means for reciprocably moving said scraper comprising a head rope and a tail rope adapted to extend in opposite directions, and means connecting the head and tail rope with each of said pivoted rear end portions comprising two pairs of members each connected adjacent the opposite ends of said pivoted rear end portions, the outermost pair of said connecting members being of sufficient length to limit the outward movement of the pivoted portions in substantially parallel relation when said members are substantially in alignment with each other and the innermost pair of said connecting members being connected to a projecting member extending inwardly from said rear end portions adjacent the points of pivotal connection thereof.

Signed at Chicago, in the county of Cook and State of Illinois, this 20th day of December, A. D. 1924.

ALFRED B. ESSELTINE.